United States Patent [19]

Kraus

[11] Patent Number: 4,471,667

[45] Date of Patent: Sep. 18, 1984

[54] FIXED RATIO TRACTION ROLLER TRANSMISSION

[75] Inventor: Charles E. Kraus, Austin, Tex.

[73] Assignee: Excelermatic Inc., Austin, Tex.

[21] Appl. No.: 422,533

[22] Filed: Sep. 24, 1982

[51] Int. Cl.³ .................. F16H 13/06; F16H 13/02
[52] U.S. Cl. ........................... 74/798; 74/206; 74/208
[58] Field of Search .............. 74/772, 798, 206, 208

[56] References Cited

U.S. PATENT DOCUMENTS

| 771,541 | 10/1904 | Ericson | 74/208 |
| 1,190,662 | 7/1916 | Matteucci74 | 208/ |
| 1,750,168 | 3/1930 | Erban | 74/208 |

FOREIGN PATENT DOCUMENTS

| 966535 | 10/1950 | France | 74/798 |
| 1321763 | 12/1963 | France | 74/798 |
| 10853 | 2/1981 | Japan | 74/798 |
| 135546 | 12/1929 | Switzerland | 74/302 |
| 191977 | 1/1967 | U.S.S.R. | 74/798 |

Primary Examiner—Allan D. Herrmann
Assistant Examiner—D. Wright
Attorney, Agent, or Firm—Klaus J. Bach

[57] ABSTRACT

In a traction roller transmission wherein a traction ring surrounds a sun roller with planetary traction rollers arranged in the space between, and in engagement with, the sun roller and the traction ring, a tapered ball screw structure is so associated with at least one of the sun roller and traction ring that a torque transmitted through the transmission causes the tapered ball screw structure to expand radially for forcing the planetary traction rollers into engagement with the traction ring and the sun roller.

7 Claims, 4 Drawing Figures

FIXED RATIO TRACTION ROLLER TRANSMISSION

BACKGROUND OF THE INVENTION

The invention relates to fixed ratio traction roller transmissions in which the contact forces applied to the traction surfaces of the transmission, which are in engagement with each other for the transmission of motion, are dependent on the torque transmitted through the transmission.

Traction roller transmissions in which large contact forces are applied to the rollers are described, for example, by Harold A. Rothbart in "Mechanical Design and Systems" Handbook, pages 14-8 and 14-9, McGraw-Hill, New York 1964. In the relatively simple arrangements of FIGS. 14.6 and 14.7 wherein the outer rings of planetary-type transmissions are slightly undersized to compress the roller arrangements therein, the surface pressure on the traction surfaces is always the same, that is, it is always high independently of the torque transmitted through the transmission.

In the arrangements shown on page 14-8 of said handbook, means are provided for engaging the traction surfaces with each other with forces which are dependent on the torque transmitted through the transmission.

In U.S. Pat. No. 771,541 a variable contact force is obtained by an outer ring structure which is compressed when a torque is transmitted. However, this arrangement requires sliding surfaces which have relatively high friction or a complicated lever arrangement which amplifies the reaction forces of the transmission to provide sufficient compression of the outer ring for its engagement with the traction rollers.

SUMMARY OF THE INVENTION

In a traction roller transmission including a traction ring, a sun roller centrally disposed within the traction ring and having a circumferential traction surface spaced from the inner surface of the traction ring and traction rollers supported in the space between, and in engagement with, the sun roller and the traction ring, the traction ring or the sun roller or both have a tapered ball screw structure so associated therewith that a torque transmitted through the transmission causes relative motion within such ball screw structure which results in its radial expansion against the adjacent traction rollers which forces the traction rollers into firm engagement with the sun roller and the traction ring with contact forces which correspond to the amount of torque transmitted through the transmission. Two ball screw structures may be used, one being associated with the traction ring and the other with the sun roller. Preferably, they are so designed that one is activated when a torque is transmitted in one rotational sense and the other when a torque is transmitted in the opposite rotational sense so that power can be transmitted by the transmission in either direction or rotation and either from the input to the output shaft or from the output shaft to the input shaft.

Ball screw structures are simple, reliable components and they require little space within such transmission so that a transmission utilizing the present invention will be reliable, small and relatively inexpensive.

DESCRIPTION OF THE PREFERRED EMBODIMENTS

Figure 1:
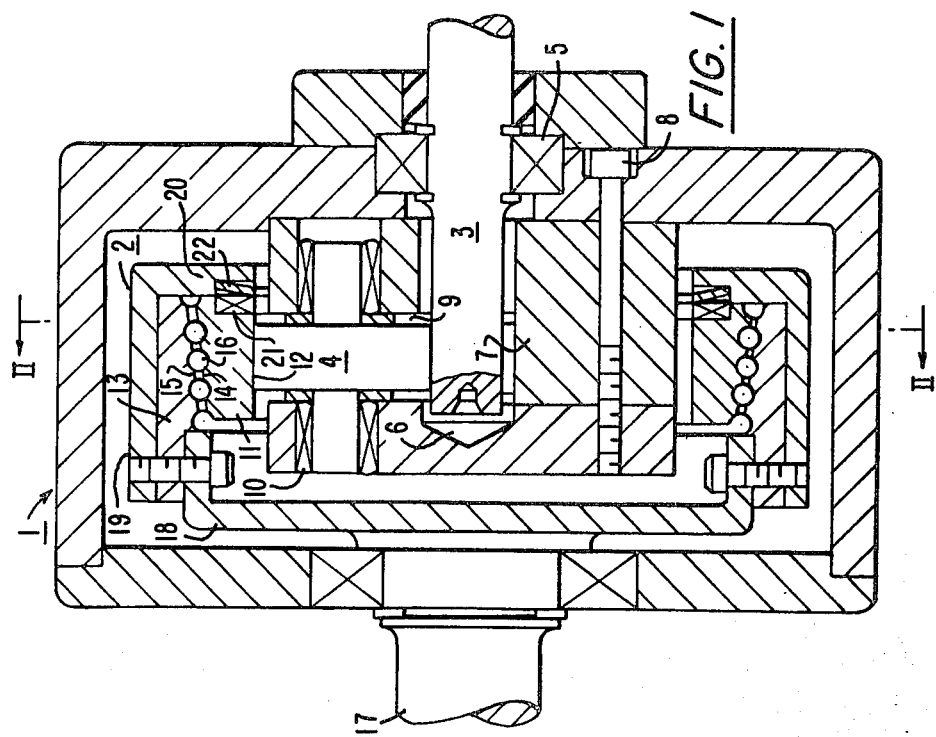
FIG. 1 is an axial cross-sectional view of the traction roller transmission.
Figure 2:
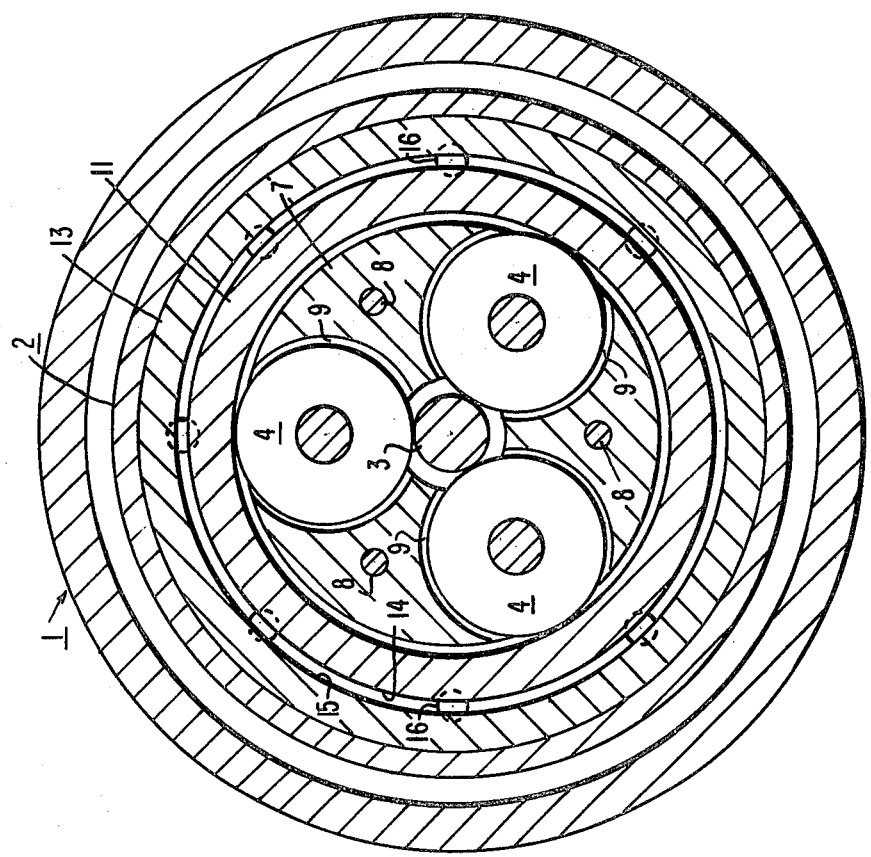
FIG. 2 is a cross-sectional view along the II—II of FIG. 1.

As shon in FIGS. 1 and 2 the traction roller transmission includes basically, in a housing 1, a traction ring structure 2, a sun roller 3 centrally disposed within the traction ring structure 2 and three (or more) traction rollers 4 arranged in the annular path between the traction ring structure 2 and the sun roller 3 and being in engagement with the traction surfaces of the ring structure 2 and the sun roller 3 for the transmission of motion therebetween.

The sun roller 3 is supported in the housing 2 by a bearing 5 and extends into a central opening 6 in a traction roller carrier 7 where it is firmly engaged and supported by the traction rollers 4. The traction roller carrier 7 is firmly mounted to the housing by bolts 8 and has cavities 9 receiving the traction rollers 4, which are supported in the carrier 7 by bearings 10.

The traction ring structure 2 includes an inner traction ring member 11 having an inner traction surface 12 in engagement with the traction rollers 4 and an outer ring member 13 surrounding the inner ring member 11. Adjacent each other, the inner and outer rings have correspondingly tapered surface areas 14 and 15 with a ball screw structure 16 so arranged in the interface area of the inner and outer traction rings that the inner ring is screwed tighter into the outer ring when a torque is transmitted. The outer traction ring 13 is connected to an output shaft 17 by means of a bell member 18. A retaining ring 19 surrounds the outer traction ring 13 and is provided with a radially inwardly projecting flange 20 against which the inner ring member 11 rests in its unloaded end position when no torque is transmitted through the transmission. Preferably, an axial thrust bearing 21 is, and a Belleville spring ring 22 may be, provided for applying a preload, both being disposed between the flange 20 and the inner ring member 11. The taper between the two ring members 11 and 13 is very small since, with accurate manufacturing methods, only a few thousands of an inch contraction is needed in order to generate the required contact pressures.

A transmission is shown in FIGS. 1 and 2 has, for example, a 6 to 1 transmission ratio with a 100,000 rpm input from a 50 HP turbine engine. The output shaft speed would then be 16,666 rpm. For this design the stresses in the ring structure are less than 50,000 PSI.

Such a transmission is very simple and very small considering the amount of power it is able to handle. For smaller transmission ratios, that is, if the sun roller may be relatively large, the ball screw structure may be associated with the sun roller or a ball screw structure may be provided in both the traction ring and the sun roller as shown schematically in FIG. 3.

Here, ball screw structures 31 and 32 are shown associated with the sun roller assembly 33 and with the traction ring assembly 34. They are so designed that one of them becomes operative when a torque is transmitted through the transmission in one direction while the other remains in its end position and the other becomes operative when a torque is transmitted through the transmission in the opposite direction during which period the first ball screw structure is in its end position. The dimensions are so selected that, when both ball screw structures are in their end positions abutting traction ring surface 35 and input shaft flange 36 respectively, a predetermined preload is provided to avoid initial slipping.

When, for example, power is supplied by the input shaft in a first direction, reaction forces on the ball screw structure 31 cause the outer ring to be screwed outwardly against the traction rollers while the inner ring of the ball screw structure 32 abuts the traction ring surface 35 through the axial thrust bearing 37. However, when the drive is pushed or when the input shaft 3 is driven in the opposite direction, that is, when the torque is reversed, the ball screw structure 31 on the sun roller structure 33 will unwind into engagement with the bearing 38 on the flange 36 and the inner ring of the ball screw structure 32 will be screwed inwardly away from the bearing 37 thereby compressing the traction rollers therebetween for engagement of the traction rollers with the sun roller assembly 33 and the traction ring assembly 34.

Figure 3:
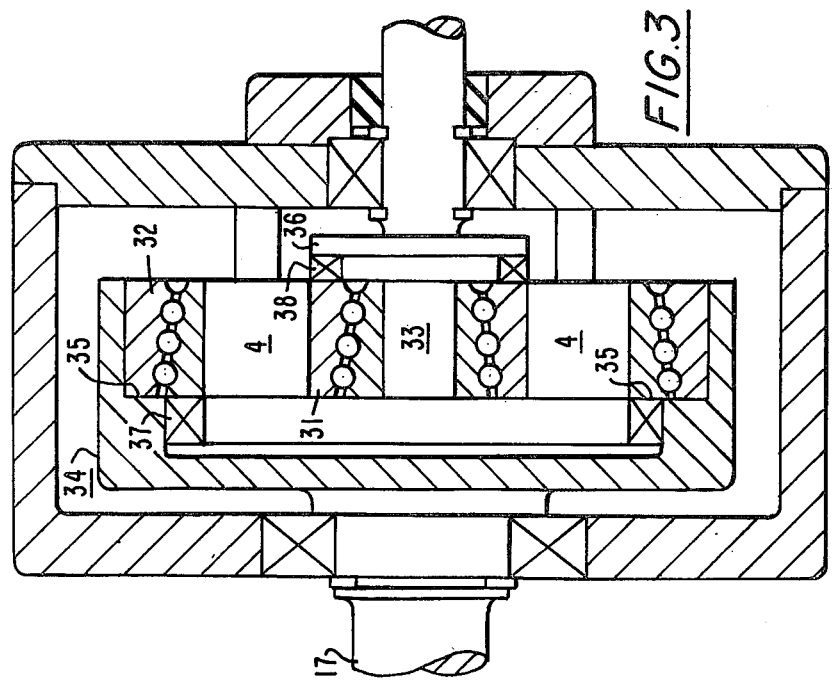
FIG. 3 is a view similar to FIG. 1, including a ball screw structure associated with the sun roller.
Figure 4:
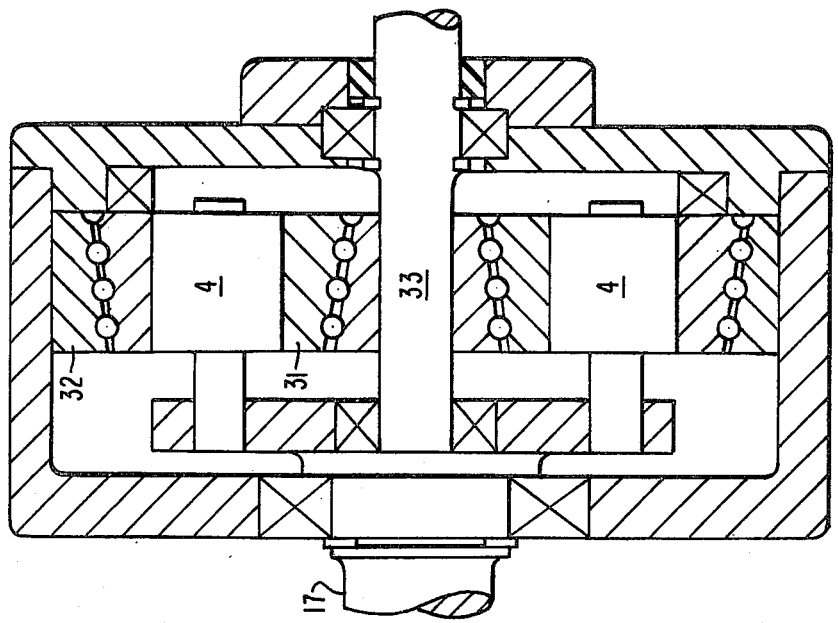
FIG. 4 shows an arrangement similar to FIG. 3 having, however, traction rollers supported in a carrier mounted on the output shaft.

FIG. 4 shows an arrangement similar to FIG. 3 wherein, however, the outer ball screw structure is associated with the housing while one of the input and output shafts carries the sun roller and the other is connected to a carrier for the traction rollers. Functionally identical parts therefore carry the same reference numerals as used in FIG. 3.

I claim:

1. A traction roller transmission comprising: a traction ring structure having an inner traction surface; a sun roller centrally disposed within said traction ring structure and having a circumferential traction surface spaced from the traction surface of said traction ring structure; and planetary traction rollers supported in the space between said sun roller and said traction ring structure and in engagement with the traction surfaces of said sun roller and said traction ring structure, at least one of said traction surfaces having a tapered ball screw structure so associated therewith that the respective traction surface is forced radially toward said planetary traction rollers when a torque is transmitted through said transmission thereby to cause firm engagement of said traction rollers with said sun roller and traction ring structure.

2. A traction roller transmission as claimed in claim 1, wherein said ball screw structure is provided with stop means so arranged as to retain said tapered ball screw structure in a preloading position wherein said traction surfaces are in engagement with said traction rollers with a predetermined minimum pressure even when no torque is transmitted through the transmission.

3. A traction roller transmission as claimed in claim 2, wherein said stop means is arranged axially adjacent the tapered ball screw structure next to said traction rollers.

4. A traction roller transmission as claimed in claim 3, wherein said stop means includes an axial thrust bearing.

5. A traction roller transmission as claimed in claim 1, wherein a first ball screw structure is associated with said traction ring structure and a second ball screw structure is associated with said sun roller structure and one is so designed as to become activated when a torque is transmitted in one rotational sense while the other is so designed as to become activated when a torque is transmitted in the opposite rotational sense.

6. A traction roller transmission as claimed in claim 1 or 5, wherein said sun roller structure is associated with one of the input and output shafts and said traction ring structure is associated with the other of said input and output shafts whereas said traction rollers are rotatably supported by a carrier mounted on a housing supporting the input and output shafts.

7. A traction roller transmission as claimed in claim 1 or 5, wherein said sun roller structure is associated with one of said input and output shafts and said traction rollers are supported by a carrier associated with the other of said input and output shafts whereas said traction ring structure is mounted on a housing surrounding the traction ring structure and supporting said input and output shafts.

* * * * *